E. M. ADAMS.
JAR COVER AND LADLE.
APPLICATION FILED APR. 22, 1918.
1,278,550.
Patented Sept. 10, 1918.
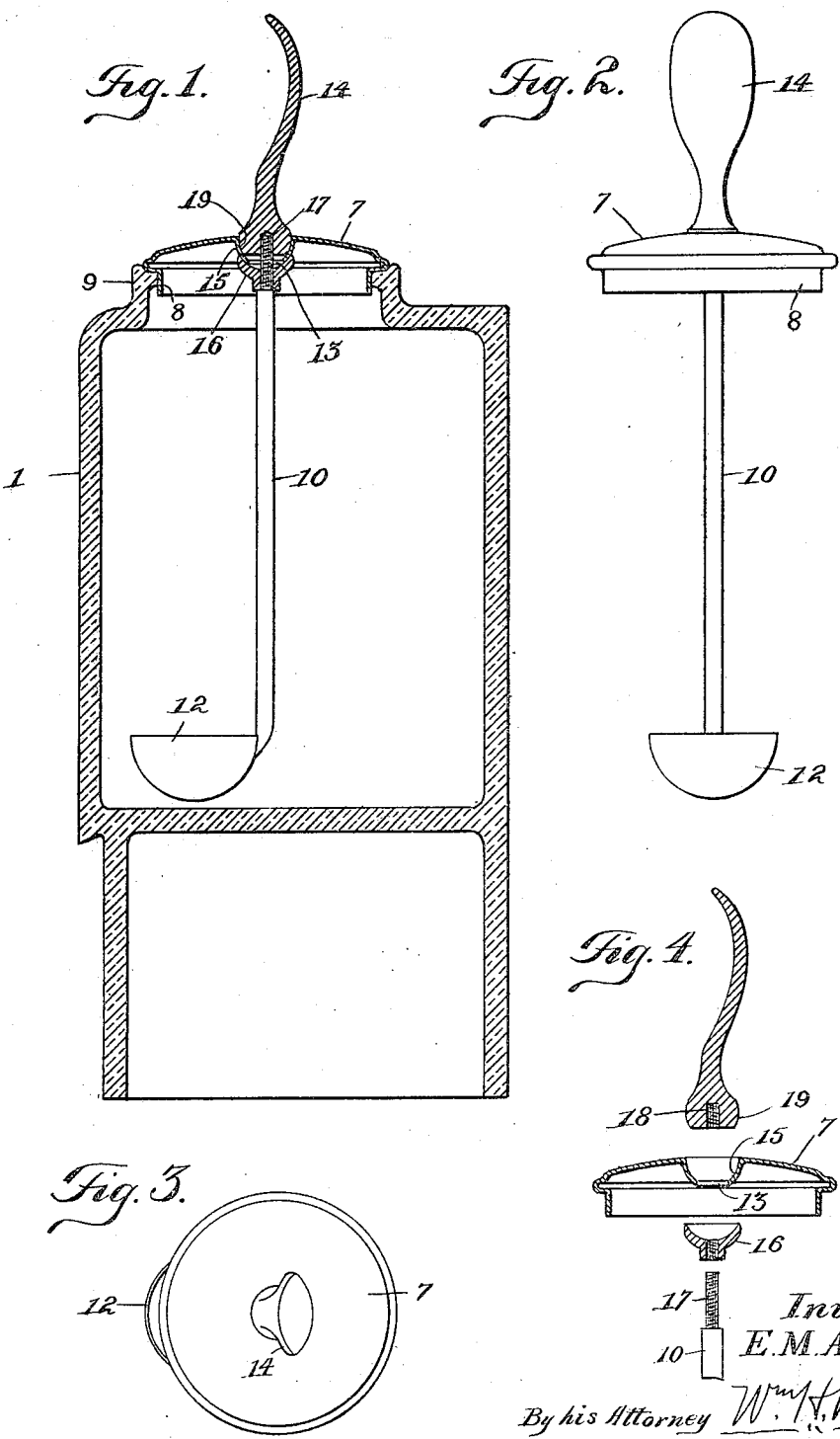

UNITED STATES PATENT OFFICE.

EDWARD M. ADAMS, OF NEW YORK, N. Y., ASSIGNOR TO MORRIS H. PETIGOR, OF NEW YORK, N. Y.

JAR-COVER AND LADLE.

1,278,550.  Specification of Letters Patent.  Patented Sept. 10, 1918.

Application filed April 22, 1918. Serial No. 229,916.

*To all whom it may concern:*

Be it known that I, EDWARD M. ADAMS, a citizen of the United States, and resident of New York, in the county of New York and State of New York, have invented certain new and useful Improvements in Jar-Covers and Ladles, of which the following is a specification.

This invention relates to containers for soda fountains, especially those used for crushed fruits and the like.

The object of the present invention is to provide an improved form of combined cover and ladle for crushed fruit jars, wherein the ladle and handle attached thereto, that projects through the top of the cover, will have a kind of universal swinging movement on the cover, so that when the cover is in position closing a jar, the ladle can be swung to cause the bowl or dipper to move around in the lower portion of the jar to agitate the contents, and thereby maintain a more uniform distribution of the fruit or solid particles in the fruit. Such a structure will also permit a removal of practically the entire contents from the bottom of the jar.

In the accompanying drawing showing one embodiment of my invention, Figure 1 is a vertical section showing the combined lid and ladle in position on a jar. Fig. 2 shows the cover and ladle in front elevation. Fig. 3 is a plan view; and Fig. 4 is a partial sectional view of the parts of the device in position to be assembled.

As shown in the drawing I provide a cover 7 that may be of any desired form, and may have a depending flange portion 8 at the margin. The flange is adapted to coöperate with the flange portion 9 of a jar 1 of any desired construction. The flange extends down over a projecting rim that will serve to properly close the jar and prevent entrance of any material.

The ladle as shown comprises a shank having a bowl 12 secured at the lower end and preferably extending substantially at right angles to the shank. The cover 7 has a central opening 13, and the stem 10 of the shank is extended through this opening. At the upper end of the shank is a handle portion 14. The shank has a movable connection with the lid at the margin of the opening, whereby the handle can be grasped and cause the bowl to be moved around the lower portion of the jar.

In the arrangement set forth I give the lid a cup-shaped structure at the margin of the opening 13, and I provide on the stem and handle, portions having concave and convex faces respectively that engage the similar faces of the cup-shaped portions of the lid. In the particular arrangement I have set forth, the lid has a cup-shaped portion 15 extending downwardly, at the bottom of which is the hole 13. The stem 10 is provided with a cup-shaped collar 16 that may have a threaded bore to screw on the threaded end 17 of the stem. This collar is given the same curvature as the lower face of the depression 15, and the hole 13 is somewhat larger than the shank to permit a swinging movement of the collar and stem on the cup portion 15 of the lid.

The handle 14 is shown as provided with a threaded bore 18 to receive the threaded end portion 17 of the stem, as shown. The handle has its lower end 19 around the threaded bore formed convex similar in shape to the cup portion 15 of the lid. These members are brought together as indicated in Fig. 4, and the threaded stem passed through the opening 13 to cause the collar 16 to engage the cup portion 15 of the lid.

The handle 14 is screwed on to the threaded end of the stem, and the depth of the threaded bore is so arranged that when the handle is screwed tight, its convex face 19 will be offset from the collar 16 a slightly greater distance than the thickness of the cup portion 15, as indicated in Fig. 1. This arrangement, together with the lateral movement of the stem in the opening 13 of the lid, will permit a free swinging movement of the ladle relative to the lid. The handle is shown as somewhat flattened and curved with the convex face of the handle on the same side of the stem to which the bowl 12 of the ladle is secured.

It will be understood from this construction that when the device is in position on the jar that the jar will be tightly closed, as the handle extends down into the cup-shaped portion of the lid, and the cup shaped collar on the shank extends up around the depression of the lid. This will form a tight closure and prevent entrance of material into the jar. At the same time the ladle has a free swinging movement on the lid, and the bowl can be shifted in all directions around the bottom of the jar. This will serve to thoroughly mix the jar contents, and will also permit the removal of practically the entire contents of the jar. It will be further seen that the device is very simple of construction and assembly. The lid can be stamped out of sheet metal or otherwise formed at a single operation. The handle is a simple unitary member with a threaded bore of short depth. The stem is merely a rod suitably secured to one edge of the bowl, as by soldering or otherwise, and has its upper end portion threaded. A simple cupped collar with a threaded bore is screwed on the stem, and then the stem is passed through the depression of the lid, and the handle is screwed to the stem. The parts can be readily removed in the same manner when desired, practically without the use of tools, and this joint is formed without the employment of solder or brazing.

What I claim is:—

1. A combined jar cover and dipping ladle, comprising a comparatively wide cover provided with a central opening, a ladle formed of a shank with a bowl secured to its lower end, the shank passing through the cover opening and arranged to seat on the margin of said opening and have a universal swinging movement on the cover, the shank having a handle portion on its upper end.

2. A combined jar cover and dipping ladle, comprising a cover provided with a central opening and a cup shaped portion at the margin of the opening, a ladle formed of a shank passing up through the cover opening, the shank being provided with bearing portions having concave and convex faces respectively to engage the opposite faces of the cupped portion of the cover to permit a universal swinging movement of the ladle on the cover, the upper end of the shank forming a handle.

3. A combined jar cover and dipping ladle, comprising a cover provided with a central opening, the cover having a cupped depression around such opening, a ladle formed of a stem with a bowl secured to its lower end, the stem projecting up through the cover opening, a ring on the stem having a concave upper face arranged to engage the cover depression, a handle secured to the stem and having a convex portion arranged to engage the upper face of the cover depression whereby to permit a universal swinging movement of the shank on the cover.

Signed at New York city, N. Y., on April 17th, 1918.

EDWARD M. ADAMS.

Copies of this patent may be obtained for five cents each, by addressing the "Commissioner of Patents, Washington, D. C."